US008513845B2

(12) United States Patent
Angelini

(10) Patent No.: US 8,513,845 B2
(45) Date of Patent: Aug. 20, 2013

(54) ADJUSTABLE TUBULAR ELECTRIC MOTOR UNIT FOR ROLL-UP ELEMENTS SUCH AS BLINDS AND SIMILAR ITEMS

(75) Inventor: Claudio Angelini, Bologna (IT)

(73) Assignee: FAAC S.p.A., Zola Predosa (Bologna) (IT)

( * ) Notice: Subject to any disclaimer, the term of this patent is extended or adjusted under 35 U.S.C. 154(b) by 871 days.

(21) Appl. No.: 12/450,031

(22) PCT Filed: Mar. 11, 2008

(86) PCT No.: PCT/EP2008/001915
§ 371 (c)(1),
(2), (4) Date: Sep. 8, 2009

(87) PCT Pub. No.: WO2008/110334
PCT Pub. Date: Sep. 18, 2008

(65) Prior Publication Data

US 2010/0078137 A1 Apr. 1, 2010

(30) Foreign Application Priority Data

Mar. 13, 2007 (IT) .............................. MI2007A0492

(51) Int. Cl.
*H02K 7/06* (2006.01)
*E06B 9/72* (2006.01)

(52) U.S. Cl.
USPC ............................................ 310/83; 160/310

(58) Field of Classification Search
USPC ............ 310/83; 160/310, 178.1 R; 475/331, 475/294, 230
See application file for complete search history.

(56) References Cited

U.S. PATENT DOCUMENTS

| | | | | |
|---|---|---|---|---|
| 4,615,371 | A | 10/1986 | Clauss | |
| 5,711,360 | A * | 1/1998 | Viotte | 160/310 |
| 6,688,787 | B2 * | 2/2004 | Arakawa et al. | 400/120.16 |
| 2006/0252588 | A1 * | 11/2006 | Fandella | 474/47 |

FOREIGN PATENT DOCUMENTS

| | | | |
|---|---|---|---|
| EP | 1 533 465 | A | 5/2005 |
| EP | 1 600 598 | A | 11/2005 |

OTHER PUBLICATIONS

PCT Search Report, Dated Jun. 3, 2008.

* cited by examiner

*Primary Examiner* — Tran Nguyen
*Assistant Examiner* — Leda Pham
(74) *Attorney, Agent, or Firm* — Hedman & Costigan, P.C.; James V. Costigan; Kathleen A. Costigan

(57) ABSTRACT

A tubular electric motor unit (10) for roll-up elements, such as blinds, curtains or similar items. It is the type intended to be housed inside a tube (11) for winding the roll-up element. The unit (10) has a tubular body (12) inside which is housed a geared motor (13) with its drive output at one end of the tubular body and a limit stop unit (14) at the other end. To transmit the rotation to the limit stop unit there is a first transmission ring (15) that is fitted so it can be rotated on a protruding portion of the limit stop unit to couple kinetically with the limit stop unit and that has an external peripheral surface intended to couple peripherally with minimal clearance with the inside surface of a tube for winding the roll-up element.

10 Claims, 2 Drawing Sheets

ADJUSTABLE TUBULAR ELECTRIC MOTOR UNIT FOR ROLL-UP ELEMENTS SUCH AS BLINDS AND SIMILAR ITEMS

This invention relates to a tubular electric motor unit of the type intended to be inserted in the winding tube for roll-up elements, such as for instance blinds or curtains, to motorize them.

So-called tubular motor units are well known in the prior art and are used in the motorization of curtains, blinds, etc. These motor units contain an electric geared motor with an output shaft near to one end of the tubular unit and a limit stop unit near to the other end. At the first end there is a wheel keyed onto the output shaft of the geared motor and at the other end there is a second wheel keyed onto a shaft governing the limit stop unit. These wheels provide the necessary coupling with the winding tube in which the motor unit is inserted. The outside diameter and shape of the two wheels determine with what specific type of winding tube the unit can be used and therefore these wheels are often replaceable to permit using the tubular motor unit with winding tubes of different cross-section and diameter. Changing wheels is not always straightforward, especially from the side of the limit stop unit where the motor unit fixing plate can prevent extraction of the wheel and require removing the entire limit stop unit. A further problem arises from the fact that in almost all tubular motors the limit stop unit differs according to the size of the tube (for instance a tubular motor Ø45 will have a different head of the limit stop unit to that of the tubular motor Ø60). This is due to the fact that the diameter of the limit stop wheel has a diameter close to the diameter of the tubular body.

A general object of this invention is to overcome the above-mentioned drawbacks by providing a tubular motor unit that allows easy and great adaptability to changing the diameter and/or shape of the winding tube. A further object is to keep the limit stop unit unchanged as the diameter of the motor unit varies.

In view of these objects it has been decided to make, according to the invention, a tubular electric motor unit for roll-up elements such as blinds, curtains or similar items, of the type intended to be housed inside a winding tube of the roll-up element, comprising a tubular body inside which a geared motor is housed with a drive output at one end of the tubular body and a limit stop unit at the other end, characterized by the fact that for the transmission of the movement of rotation to the limit stop unit there is a first transmission ring that is fitted so it can be rotated on a protruding portion of the limit stop unit to couple kinetically with the limit stop unit and that has an external peripheral surface intended to couple peripherally with minimum clearance with the inside surface of a winding tube of the roll-up element, the ring being able to be opened and closed again for replacement on the limit stop unit.

According to another aspect of the invention, in view of the above-mentioned objects, it has been decided to make a tubular motor unit characterized in that in a radial space between the limit stop unit and the tubular body there is a replaceable adapter ring for coupling with minimal radial clearance with the tubular body and the limit stop unit as their relative diameter varies.

In order to make clearer the explanation of the innovative principles of the present invention and the advantages thereof over the prior art, with the help of the enclosed drawings a possible embodiment thereof applying such principles will be disclosed below. In the drawings.

Figure 1:
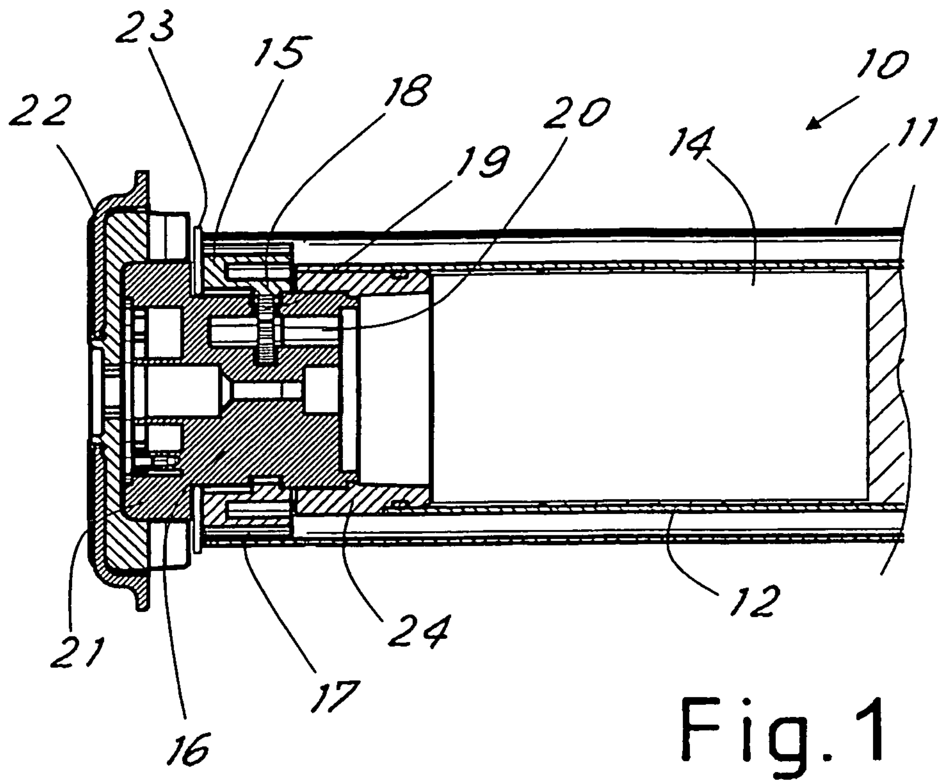
FIG. 1 is a partially longitudinal section view of one end of the tubular motor unit.
Figure 2:
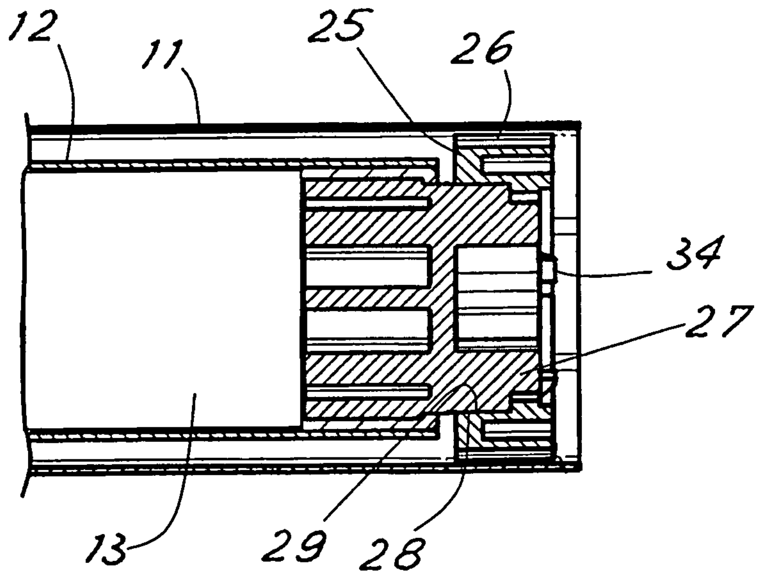
FIG. 2 is a partially longitudinal section view of the other end of the tubular motor unit.

With reference to the figures, in FIGS. 1 and 2 there are shown the opposite ends of a tubular electric motor unit (indicated generically with 10) for roll-up elements such as blinds, curtains or similar items. The unit 10 is the type intended to be housed inside a winding tube 11 of the roll-up element (not shown), according to a prior art. This motor unit comprising a tubular body 12 inside which is housed and locked a geared motor 13 with a drive output at one end of the tubular body (FIG. 2) and a limit stop unit 14 at the other end (FIG. 1). The geared motor and the limit stop unit are not described here in greater detail as they are both easily imaginable by those skilled in the art.

To transmit the rotation to the limit stop unit 14 there is a first transmission ring 15 that is fitted so it can be rotated on a portion 16 of the limit stop unit that stands out from the tubular body 12. The ring 15 couples kinetically with the limit stop unit to transmit its rotation to it and has an external peripheral surface 17 that is intended to couple peripherally with minimal clearance with the inside surface of the special tube 11 for winding the roll-up element.

Specifically, the ring 15 is coupled kinetically with the limit stop unit by means of a ring gear 18 on its internal peripheral surface and that engages a complementary cogwheel 19 in the limit stop unit. The cogwheel 19 is keyed on a spindle 20 that transmits the motion to the limit stop unit, moreover in itself known. For instance, the rotation of the spindle 20 will, according to the direction of rotation, turn on appropriate microswitches after a pre-set number of turns, corresponding to the position of complete winding and complete unwinding of the roll-up element. The portion of the limit stop unit that stands out from the end of the tubular body is advantageously mushroom shaped, with a head 21 that is intended to be inserted in an element 22 supporting the end of the assembly formed by the motor unit 10 and the winding tube 11.

The ring 15 is housed with little end float between the end of the tubular body 12 and the head 21 of the mushroom. Advantageously, on the ring 15 a flange 23 is engaged sideways that goes between the ring and the head 21 of the limit stop unit and that has such a diameter as to stand out radially from the ring and form a stop for inserting the motor unit 10 into the winding tube 11.

Advantageously, in a radial space between the limit stop unit and tubular body 12 is inserted an adapter ring 24 for coupling with minimal radial clearance of the tubular body on the limit stop unit. The adapter can be changed as the relative diameter of the limit stop unit and tubular body changes, so as to be able to use the same limit stop unit in tubular bodies of different diameter (and usually with a different geared motor). As will be clear from the following, the adapter comprises on its external surface elements of engagement with the tubular body and on its internal surface elements of engagement with the limit stop unit to provide a restraint against their reciprocal axial rotation.

As can well be seen in FIG. 2, at the other end of the motor unit there is advantageously present a second ring 25 with an external peripheral surface 26 also intended to couple peripherally with minimal clearance with the inside surface of the winding tube 11. The ring 25 is fitted, coaxially to the tubular element, on a rotary head 27 that is set in rotation by the geared motor 13. The ring 25 thus transmits the movement from the geared motor to the winding tube 11.

Figure 3:
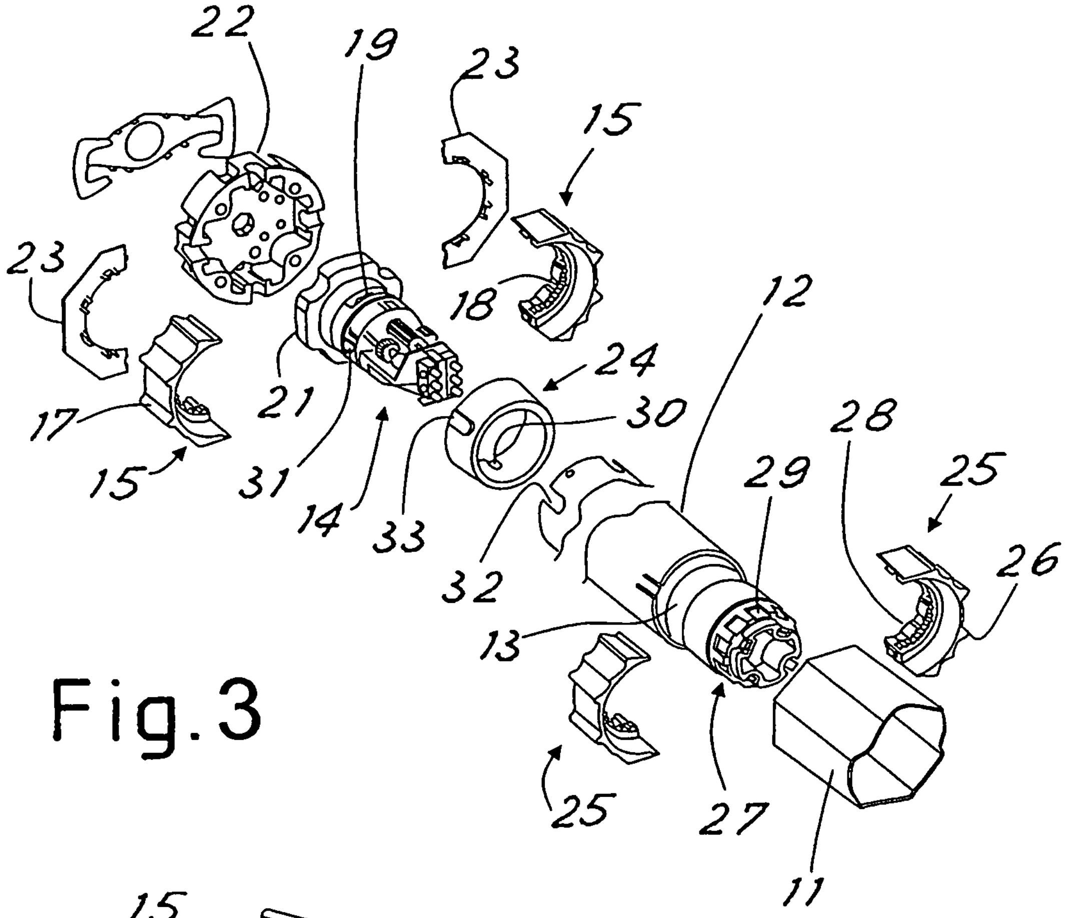
FIG. 3 is an exploded perspective schematic view of the tubular motor unit.

As can well be seen in the exploded view of FIG. 3, the ring 15 can, advantageously, be opened in two equal halves, to be easily fitted and removed from the limit stop unit. Known means of engagement that can be released between the two halves enable assembling the ring. In this way the ring 15 can be replaced on the limit stop unit without needing any other operation of disassembly/assembly. With rings 15 of different outside diameter and/or different conformation of the external peripheral surface it is possible to adapt the unit to different winding tubes 11. As can be seen in the figure, also flange 23 is formed of two halves that can be separated for disassembly and replacement if necessary.

As can be seen in FIGS. 2 and 3, between ring 25 and rotary head 27 there are means of engagement, against reciprocal axial rotation, advantageously made with grooved couplings 28 and 29 on the radially facing surfaces of ring and head and that can be reciprocally engaged with a movement of axial insertion.

Advantageously, the ring 25 can be made equal to the ring 15, so that the two rings are interchangeable and can be made more cost-effectively.

Especially in such a case the grooved couplings can advantageously be made with a cutaway section. This makes the assembly of the two halves of the ring 25 more secure, preventing it from opening during transmission of the power torque.

FIG. 3 also shows the means of engagement against rotation present on the adapter 24. These means are advantageously made with elements of engagement of the adapter ring on the limit stop unit, made with slots 30 that receive complementary ribs 31, and elements of engagement of the adapter ring on the tubular element 12, made with slots 32 that receive complementary ribs 33.

Figure 4:
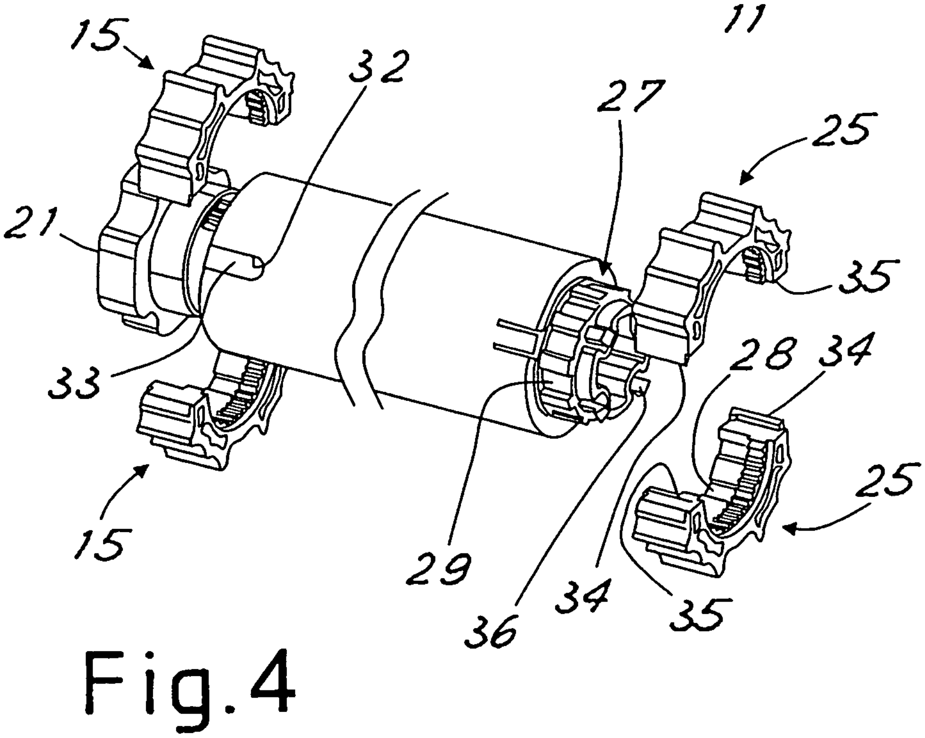
FIG. 4 is a partial and schematic perspective view of the motor unit with open and separate adapter rings.

The latter can also be seen in FIG. 4, where the assembled motor unit can be seen, not yet inserted in the winding tube and with the rings 15 and 25 of drive transmission opened in their two halves.

In FIG. 4 couplers 34 and 35 are more visible for assembling the two halves of each ring to form the whole ring.

Still in FIG. 4, the advantageous structure of the rings 15 and 25 is also more visible that enables having two identical rings both on the limit stop unit and on the geared motor.

Specifically, it is seen how the equal rings comprise on their internal peripheral surface both the means 28 of engagement with the head of rotation 27 and the means 18 of kinetic coupling with the limit stop unit to be indistinctly interchangeable with each other. The ring gear 18 is matched with the cutaway couplers 28 to come to be more external than the couplings 29 on the head of rotation when the ring is used to transmit the motion of the geared motor. In addition, the couplers 28 have less radial stand-out than the ring gear 18, so as to slide without hindrance on a cylindrical surface of the limit stop unit when the ring is used to transmit rotation to the limit stop unit.

Again advantageously the head of rotation comprises teeth or tabs 36 for coupling the ring to lock it against axial extraction. These teeth 36 advantageously engage on a side edge of the ring gear 18.

At this point it is clear how the preset objects have been achieved, providing a tubular motor unit of simple and relatively economic construction that has easy and high adaptability for assembling in different winding tubes.

Naturally, the above description of an embodiment applying the innovative principles of the present invention is provided by way of example of such innovative principles and must not therefore be taken to limit the scope of what is claimed herein. For example, the external surface of the rings can have various types of structure, as easily imaginable by those skilled in the art, to adapt to the various winding tubes. For instance, the surfaces can be variously finned to adapt to winding tubes with a polygonal section, or themselves be polygonal. Naturally, the proportions between the various parts of the device can vary according to specific requirements.

The invention claimed is:

1. A tubular electric motor unit (10) for roll-up elements such as blinds, curtains or similar items, of the type intended to be housed inside a winding tube (11) of the roll-up element, comprising a tubular body (12) inside which a geared motor (13) is housed with a drive output at one end of the tubular body (12) and a limit stop unit (14) at the other end, wherein for the transmission of the movement of rotation to the limit stop unit (14) there is a first transmission ring (15) that is fitted so that said first transmission ring (15) can be rotated on a protruding portion of the limit stop unit (14) to couple kinetically with the limit stop unit (14), said first transmission ring has an external peripheral surface coupled peripherally with minimal clearance with an inside surface of the winding tube of the roll-up element, said first transmission ring (15) being able to be opened and closed again for replacement on the limit stop unit (14), said tubular electric motor unit having a second transmission ring (25) with an external peripheral surface coupled peripherally with minimal clearance with the inside surface of the winding tube and said second transmission ring is fitted, coaxially to the tubular body (12), on a rotary head (27) that is set in rotation by the geared motor, wherein said first transmission ring (15) and said second transmission ring (25) are identical to each other and comprise on their internal peripheral surface both means (28) of engagement with the rotary head and means (18) of kinetic coupling with the limit stop unit (14) so that said first transmission ring (15) and said second transmission ring (25) are indistinctly interchangeable with each other, wherein the means of engagement of the second transmission ring (25) on the rotary, head comprise grooved couplings (28) to be inserted in complementary grooved couplings (29) on a periphery of the rotary head and the means of kinetic coupling with the limit stop unit (14) comprise a ring gear (18) joined by said grooved couplings (28) to couple with a complementary cogwheel (19) in the limit stop unit (14).

2. Unit according to claim 1, characterized in that the first transmission ring (15) divides into two halves that comprise means (34, 35) of reciprocal interconnection with a coupling to form the whole first transmission ring (15).

3. Unit according to claim 1, characterized in that the first transmission ring (15), for kinetic coupling with the limit stop unit (14), comprises a ring gear (18) on its internal peripheral surface and that engages a complementary cogwheel (19) in the limit stop unit (14).

4. Unit according to claim 1, characterized in that a portion of the limit stop unit (14) that stands out from the end of the tubular body (12) is mushroom shaped and the first transmission ring (15) is housed with little end float between said end of the tubular body (12) and the mushroom head (21) of the mushroom shaped portion of the limit stop unit (14).

5. Unit according to claim 4, characterized in that on the first transmission ring (15) a flange (23) is engaged sideways, formed in two dismountable halves, that is set between the first transmission ring (15) and the mushroom head (21) of the limit stop unit (14) to stand out radially from the first transmission ring (15) and forms a stop for inserting the motor unit in the winding tube (11) of the roll-up element.

6. Unit according to claim 1, characterized in that the grooved couplings (28, 29) are cutaway.

7. Unit according to claim 1, characterized in that the rotary head (27) comprises teeth (34) for snap coupling of the second transmission ring (25) to lock it against axial extraction.

8. Unit according to claim 7, characterized in that the snap coupling teeth (34) engage on a side edge of the ring gear (18).

9. Unit according to claim 1, characterized in that in a radial space between the limit stop unit (14) and the tubular body (12) there is a replaceable adapter ring (24) for coupling with minimal radial clearance with the tubular body (12) and the limit stop unit (14) as their relative diameter varies.

10. Unit according to claim 9, characterized in that the replaceable adapter ring (24) comprises on its external surface elements of engagement (33) with complementary elements of engagement (32) in the tubular body (12) and on its internal surface elements of engagement (30) with complementary elements of engagement in the limit stop unit (14) to form a restraint against their reciprocal axial rotation.

* * * * *